(12) United States Patent
Rankl

(10) Patent No.: US 9,477,325 B2
(45) Date of Patent: Oct. 25, 2016

(54) DEVICE AND METHOD FOR IDENTIFYING A LASER POINTER

(71) Applicant: Robert Bosch GmbH, Stuttgart (DE)

(72) Inventor: Tobias Rankl, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 135 days.

(21) Appl. No.: 14/408,035

(22) PCT Filed: Apr. 24, 2013

(86) PCT No.: PCT/EP2013/058479
§ 371 (c)(1),
(2) Date: Dec. 15, 2014

(87) PCT Pub. No.: WO2013/185964
PCT Pub. Date: Dec. 19, 2013

(65) Prior Publication Data
US 2015/0177852 A1    Jun. 25, 2015

(30) Foreign Application Priority Data
Jun. 14, 2012    (DE) .................. 10 2012 210 065

(51) Int. Cl.
*G06F 3/03* (2006.01)
*G06F 3/038* (2013.01)
(52) U.S. Cl.
CPC ........... *G06F 3/0304* (2013.01); *G06F 3/0386* (2013.01)

(58) Field of Classification Search
CPC ...... G06F 3/03; G06F 3/0354; G06F 3/0416; G06F 3/033
USPC ......... 250/221, 208.1; 345/157–179; 353/42, 353/43, 48
See application file for complete search history.

(56) References Cited

U.S. PATENT DOCUMENTS

| 5,612,736 A | 3/1997 | Vogeley et al. |
| 8,049,721 B2 * | 11/2011 | Tagawa ................ G06F 3/0386 178/19.05 |
| 2008/0029316 A1 | 2/2008 | Jaeger et al. |

FOREIGN PATENT DOCUMENTS

| EP | 0515015 | 11/1992 |
| EP | 1087327 | 3/2001 |

OTHER PUBLICATIONS

International Search Report for PCT/EP2013/058479, issued on Jul. 19, 2013.

* cited by examiner

*Primary Examiner* — Que T Le
(74) *Attorney, Agent, or Firm* — Norton Rose Fulbright US LLP

(57) ABSTRACT

A device is provided for identifying at least one laser pointer, including a laser projector having a scanning mirror device by which a projection surface is able to be scanned periodically; a modulation device for a laser beam of the at least one laser pointer; and a detection device, situated within the laser projector, for detecting the modulated laser beam of the at least one laser pointer.

16 Claims, 8 Drawing Sheets

DEVICE AND METHOD FOR IDENTIFYING A LASER POINTER

FIELD OF THE INVENTION

The present invention relates to a device for identifying at least one laser pointer. In addition, the present invention relates to a method for identifying at least one laser pointer.

BACKGROUND INFORMATION

Laser projectors without optics and having a micromirror unit (scanning mirror laser projector) that scans a projection surface are already known. Also known are light pointer devices, such as laser pointers which, for example, are used to draw the attention of viewers to a particular section of a presentation.

In addition, the related art describes various multiple-access methods for media.

European Published Patent Application No. 1 087 327 discloses an interactive presentation control system; a speaker in this instance controls a presentation by projecting previously defined spatial patterns onto a projection surface by means of a laser beam emitted from a laser pointer. The previously defined spatial patterns are detected and interpreted by the control system, which then outputs display commands to a projector.

U.S. Pat. No. 5,612,736 describes a micro mirror projector in which a position of a pointing device in relation to the projected image is able to be automatically detected.

European Published Patent Application No. 0 515 015 A2 describes a method for interacting with a computer-generated image.

U.S. Published Patent Appln. No. 2008/029316 A1 describes a method for detecting the position of an input device on a monitor while using infrared light.

SUMMARY

According to a first aspect, the present invention provides a device for identifying at least one laser pointer, which includes:
 a laser projector having a scanning mirror device, by which a projection surface is able to be scanned periodically;
 a modulation device for a laser beam of the at least one laser pointer; and
 a detection device, situated within the laser projector, for detecting the modulated laser beam of the at least one laser pointer.

According to another aspect, the present invention provides a method for identifying at least one laser pointer, the method including the following steps:
 emitting a laser beam by means of the laser pointer (4) onto a projection surface (2), the laser beam being modulated by a modulation device (10);
 scanning the projection surface (2) by means of a detection device (20) of a laser projector (3); and
 identifying the laser pointer (4) with the aid of the modulated laser beam.

One advantage of the present invention is that the invention allows the identification and localization of laser light points of one or more laser pointer(s) on a projection surface. The laser pointer is thereby advantageously able to assume the function of a mouse pointer, for example, in order to select operating menus of the laser projector or menu items of applications that are projected by the laser projector. The mentioned control is advantageously able to be carried out essentially in real time.

According to one preferred specific embodiment of the present invention the modulation device is provided to control the light intensity of the laser beam emitted by the laser pointer. This advantageously provides encoded information about the laser pointer by means of a modulated laser light beam, which is able to be decoded using known technologies.

One preferred specific embodiment of the present invention provides that a multi-access method may be carried out using the modulation device, a CDMA code being able to be generated, in particular. In this way a reliable encoding method is advantageously used for modulating or encoding the laser light beam of the laser pointer.

In one preferred specific embodiment of the present invention the laser pointer has at least one functionality, and one CDMA code generator is provided per functionality. This advantageously realizes a reliable multitude of functions of the laser pointers via different codes.

In preferred specific embodiments of the device, the laser pointer has switches for selecting the functionalities, the switches being developed as mechanical switches or motion sensors. This makes it possible to adjust or select the functionalities of the laser pointer in different ways.

In one preferred specific embodiment of the present invention, a photo diode is situated in a receiver of the laser projector, and light reflected at the projection surface is coupled into the photo diode. This advantageously utilizes a physical wave propagation principle of the laser light and technically implements it to identify the laser pointer.

One preferred specific embodiment of the present invention provides that the detection device also includes a correlation device, which can be used to correlate binary data with CDMA codes. This makes use of the trusted technical correlation principle for the reliable identification or localization of the laser pointers.

One preferred specific embodiment of the device provides that the correlation device has multiple correlators, which are placed in the form of a rake, each correlator being provided for one CDMA code. A rake receiver advantageously assists in rapid, parallel correlating of the data.

One preferred specific embodiment of the device is characterized by the fact that each correlator is longer than each utilized CDMA code. Due to the length of the correlators, this advantageously makes it possible to dispense with a synchronization between the CDMA codes, because complete cyclical shifting of the CDMA codes is made possible.

In one preferred specific embodiment of the present invention, a position detection device links the data output by the correlation device with positional data of the scanning mirror device. This advantageously makes it possible to obtain unambiguous positional data for positions of light points of the laser pointers on the projection surface.

In one advantageous further refinement of the device, the detection device furthermore includes a position-estimation device for the at least one laser pointer, and midpoints of the positional data of the position detection device are estimated with the aid of the position estimation device. In this way it is advantageously possible to optimize or refine the position detection for the light points of the laser pointers.

In one preferred specific embodiment of the device, the laser pointer emits laser light having different wavelengths. For example, this makes it possible to radiate laser light that is harmless for the human eye to a more pronounced degree, so that the position detection of the laser pointer is able to be carried out in a much more precise and reliable manner.

In one preferred specific embodiment of the device, a computing device is connected to the laser projector, and the laser pointer is able to control applications executed by the computing device. As a result, the laser pointer is then advantageously able to be used for controlling applications of the computing device, and no cable link is required between the laser pointer and computing device.

Additional features and advantages of the present invention are explained below on the basis of specific embodiments and with reference to the figures. In this context, all of the described or represented features, alone or in any combination, form the subject matter of the present invention, regardless of their combination in the patent claims or their antecedent reference, and regardless of their wording and representation in the specification and in the figures. The figures are mainly intended to illustrate the principles that are essential for the present invention. In the figures, identical reference symbols denote identical or functionally equivalent elements.

DETAILED DESCRIPTION

Figure 1:
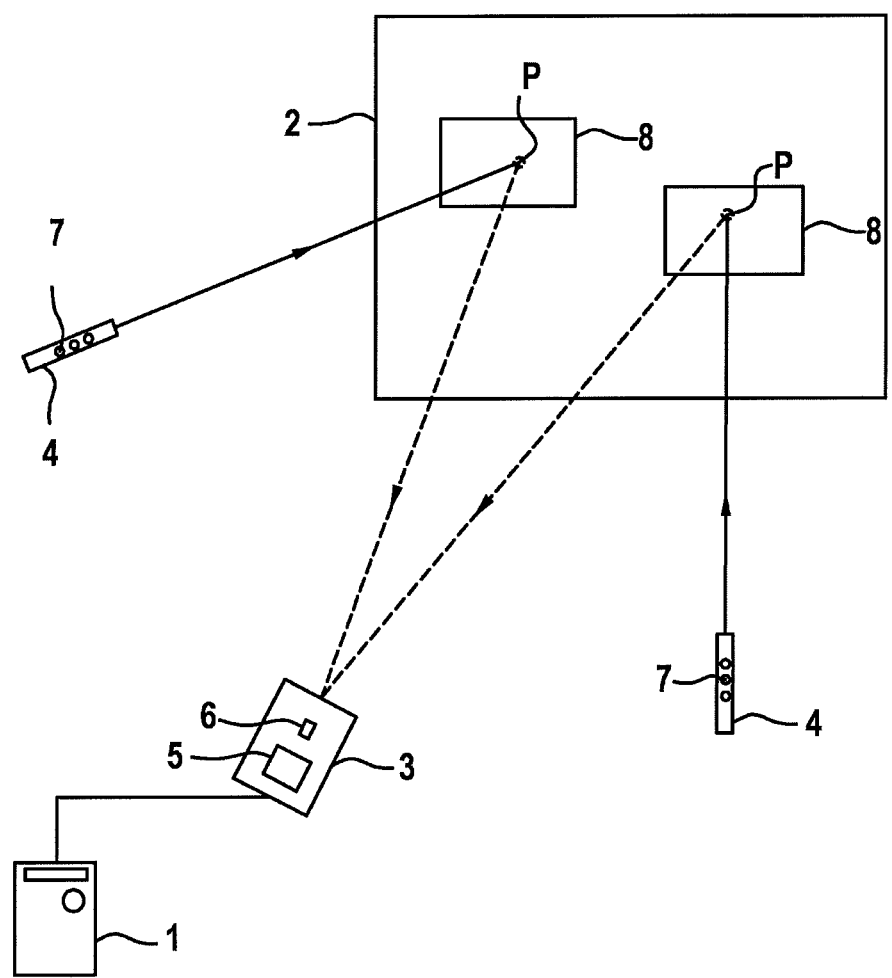
FIG. 1 shows a basic configuration of one specific embodiment of the device of the present invention.

FIG. 1 shows a basic overall configuration of one specific embodiment of the device of the present invention.

A computing device 1 (such as a computer, notebook, mobile telephone, smartphone, etc.) may be connected to a laser projector 3. Laser projector 3 is developed as a so-called scanning mirror laser projector and includes a scanning mirror unit 5, which is able to project an image (such as an application executed by computing device 1) onto a projection surface 2. Through a mobile oscillating motion of scanning mirror device 5, laser projector 3 steers an imaging laser light beam onto projection surface 2 and sweeps it in a cyclical manner. In this way only a single light point is imaged at all times, and a viewer gets the impression of a complete image due to a high imaging speed. An image on projection surface 2 includes content 8 with interactivity capability (such as a program window, operating elements, menus, etc.).

One or more laser pointer(s) 4 emit(s) a straight laser beam onto projection surface 2, which causes a light point P to be formed at an impingement point of the laser beam on projection surface 2. For safety reasons (laser protection categories) laser pointers 4 are restricted in their output power. From light point P, the light is reflected to laser projector 3 as reflected, damped scattered light in the form of semispherical waves (not shown). The reflected scattered light is coupled into the beam path of laser projector 3.

Laser pointer 4 may have several switches 7, by which functionalities (e.g., pointing functionalities, key 1, key 2, etc.) of light pointer 4 are able to be controlled. Switches 7 may be fully or partially embodied as motion sensors, and a functionality is controllable by pressing key 7 or by an appropriate motion of laser pointer 4.

An interaction between laser pointer 4 and laser projector 3 or computing device 1 requires knowledge of the position of a light point P on projection surface 2 generated by a laser pointer 4 is necessary. Only then will it be possible to differentiate between different activated functionalities of laser pointer 4 and/or between multiple laser pointers 4.

For this purpose, the present invention proposes to make a light beam of laser pointer 4 on projection surface 2 identifiable and to ascertain its position by using a multi-access method (e.g., CDMA=code division multiple access). Using the method of the present invention advantageously makes it possible to recognize and further process commands that are output by laser pointer 4.

The present invention includes components/program components in laser pointer 4, in laser projector 3 and, optionally, in connected computing device 1. For example, application programs can be opened and closed in this manner, windows be shifted, operating systems and application programs be controlled and/or content in application programs be prepared, etc.

Figure 2:
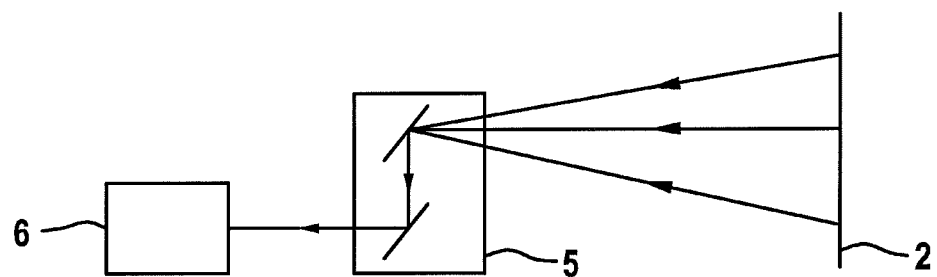
FIG. 2 shows a basic representation of a directional optical receiver.

FIG. 2 schematically illustrates a detail of laser projector 3 having movable scanning mirror device 5 and a photo diode 6. Scanning mirror device 5 is preferably developed as a micromechanical (MEMS) mirror unit. Photo diode 6 is situated in the receiving beam path of laser projector 3. Beam paths of scanned regions of projection surface 2 are coupled into laser projector 3 and imaged on photo diode 6.

In the direction opposite from the projection, laser projector 3 operates through photo diode 6 and thus as a directed optical receiver. A directional characteristic of this optical receiver is developed in such a way that only a small section of projection surface 2 is imaged on photo diode 6 at all times. In the system configuration of the present invention, an optical communication link includes laser pointer 4 as transmitter and laser projector 3 as receiver.

A directional characteristic (spatial resolution, spatial sensitivity) of the employed laser projector 3 is weaker in the receiving direction than in the projection direction, so that the spatial resolution in the receiving direction is lower than in the projecting direction.

These system properties require a compromise in the system design between the magnitude (i.e., the light intensity) of laser pointer 4 and the identification capability of the system. If the laser beam emitted by laser pointer 4 is too small in its diameter, then the CDMA codes encoded therein are not fully scannable because the scanning time over light point P is insufficient. On the other hand, if the laser beam emitted by laser pointer 4 is too large in its diameter, then the spatial resolution is reduced and consequently the precision of the identification, as well. If an intensity of laser pointer 4 is too low, it may furthermore happen that the sensitivity of the receiver is no longer sufficient for detecting the CDMA codes.

In consideration of the aforementioned aspects, the system according to the present invention is therefore configured in such a way that both a high spatial resolution and sufficient light intensity of the laser beam of laser pointer 4 are provided. In one variant, two different wavelengths may be used for the laser beam of laser pointer 4. A first wavelength (e.g., red laser light) is used for the optical display, which allows a user to display light point P in a manner that makes it easily detectable. A second wavelength (such as infrared laser light) generates a larger (invisible) light point that is used for identifying laser pointer 4.

Figure 3:
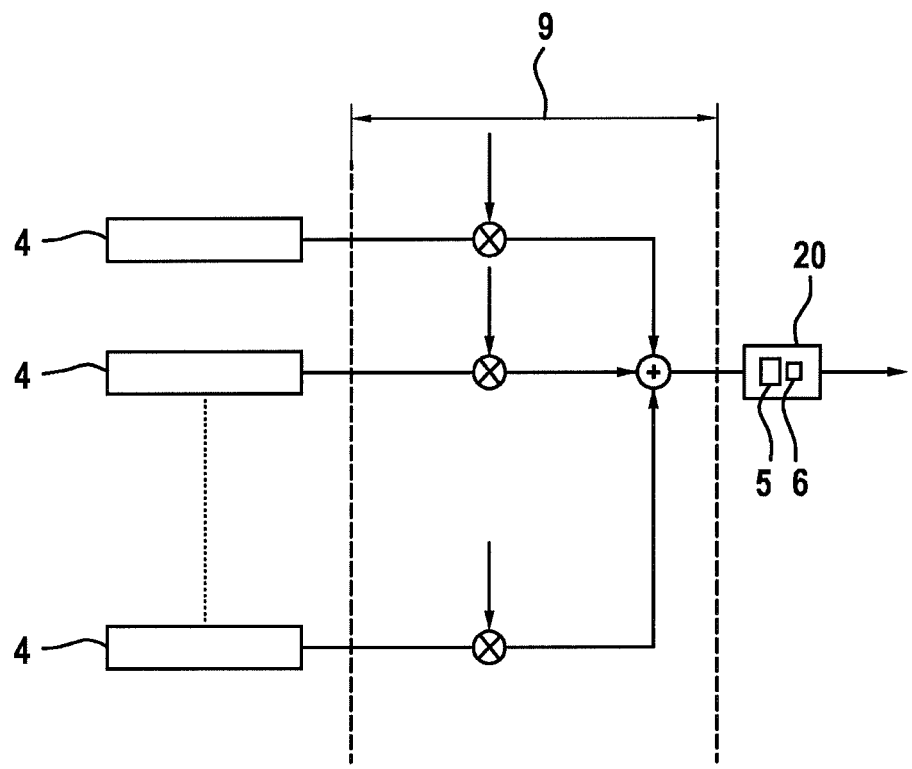
FIG. 3 shows a basic representation of a system having multiple laser pointers.

FIG. 3 shows a block diagram of a system having multiple laser pointers 4. A light propagation path 9 of laser light of laser pointers 4 is sketched within dashed lines. Light propagation path 9 is schematically illustrated as damping and superpositioning. The laser beams of laser pointers 4 are damped within laser propagation path 9. A detection device 20 according to the present invention, which will be explained in greater detail on the basis of FIG. 6, not only includes the scanning mirror device 5 and photo diode 6, but also encompasses an analog and a digital receiving electronics system (not shown). Positional data of laser pointer 4 are output as an output signal of receiving device 20 for the further use to a subsequent signal processor.

Figure 4:
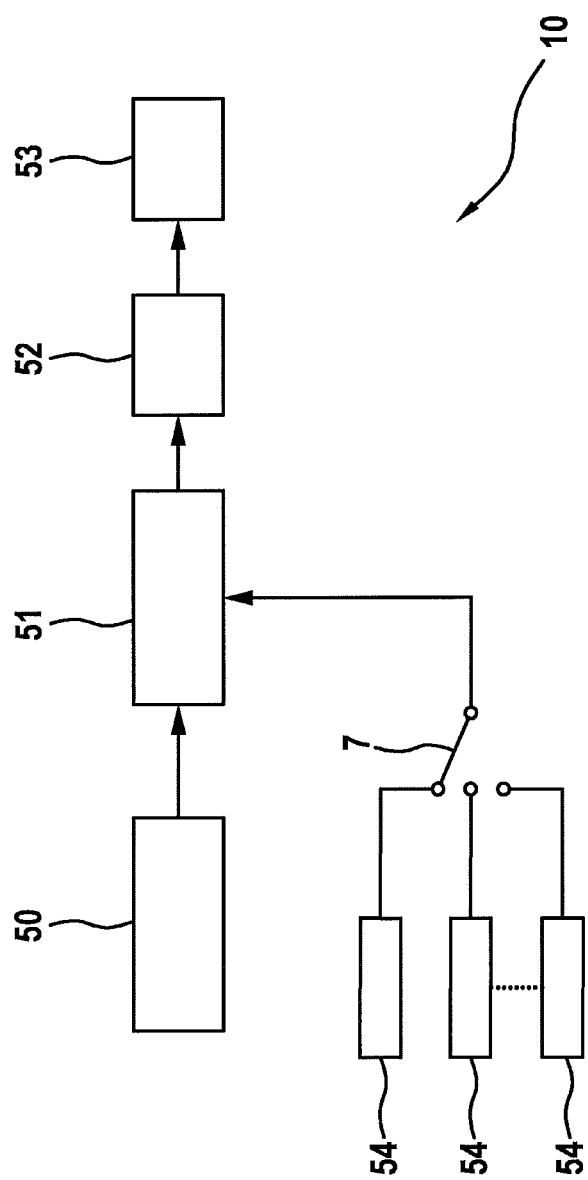
FIG. 4 shows a basic block diagram of a modulation device of the laser pointer according to the invention.

FIG. 4 shows a block diagram of a basic structure of a modulation device 10 of laser pointer 4. Modulation device 10 includes a code generator 50, which is able to generate a multitude of codes 54 based on a selection by switch 7. The selection of code 54 to be generated is implemented via switch 7 with a specific actuation characteristic (e.g., tap, double tap, etc.) or via a motion sensor (not shown). Codes 54 are preferably developed as CDMA codes and generated exclusively or in a rarely recurring pattern for each different functionality of laser pointer 4, or separately for each laser pointer 4.

Generated code 54 is forwarded as a binary sequence to a laser driver 51, which actuates a downstream laser diode 52 that emits modulated or encoded laser light via an optics system 53. The modulated laser light is output in the direction of projection surface 2 with the aid of laser pointer 4.

Figure 5:
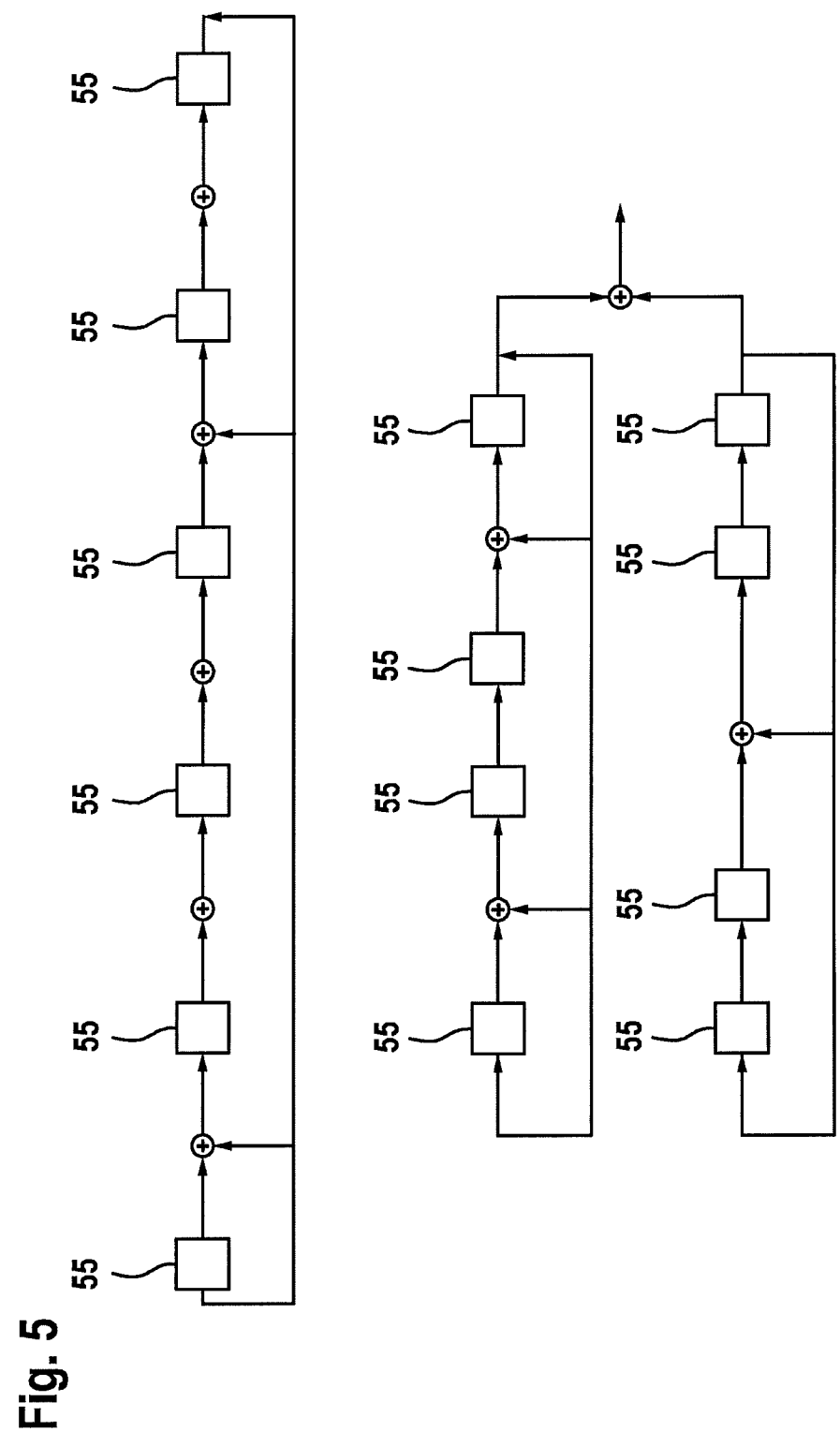
FIG. 5 shows basic illustrations of devices for generating codes used according to the present invention.

Using two schematic switching examples, FIG. 5 illustrates the manner in which codes 54 are realizable with the aid of linear clocked shift registers. For this purpose, bistable memory elements 55 (e.g., storage flipflops) are interconnected in series using feedback branches in order to generate pseudo-noise sequences. As an alternative, a second schematic circuit is shown in the lower region of FIG. 5, by which Gold sequences can be generated with a minimum of effort. The codes generated with the aid of the illustrated circuits are binary sequences having excellent cross-correlation characteristics (e.g., also m-sequences or Kasami sequences). Options for realizing the so-called shift registers are either an implementation using application-specific semiconductor circuits (ASICs) or an implementation via software.

Figure 6:
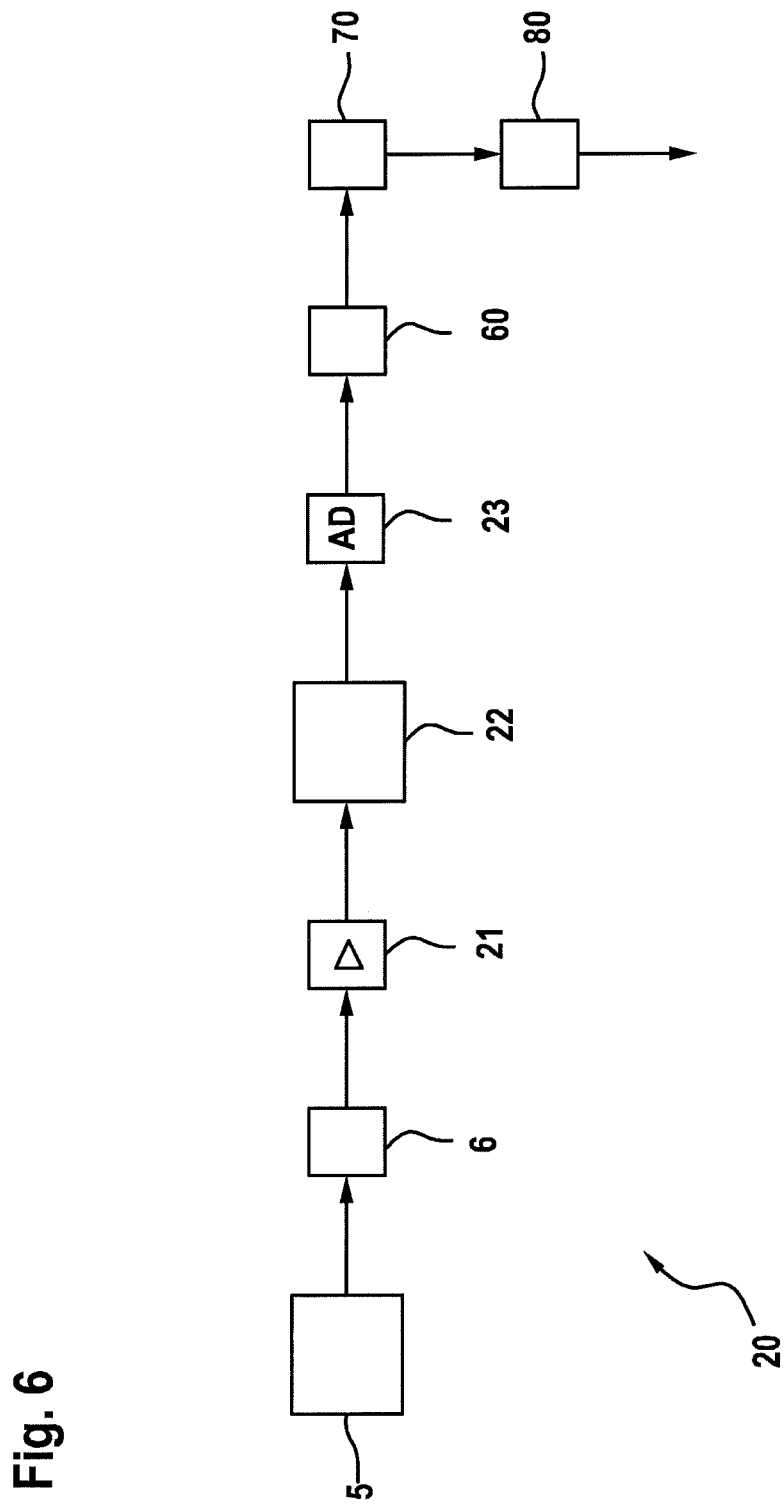
FIG. 6 shows a basic circuit diagram of a detection device according to the present invention.

FIG. 6 shows a basic block diagram of detection device 20 according to the present invention. The laser light reflected from projection surface 2 is coupled into scanning mirror device 5 and converted into an electric current with the aid of photo diode 6. A downstream amplifier 21 (e.g., a trans-impedance amplifier) and an automatic amplification control 22 condition the signals in order to optimize them for a quantization range of a downstream analog-digital converter 23. A correlation device 60 detects the CDMA codes contained in the forwarded signal according to the correlation principle. A position-detection device 70 reconstructs the scanned or sampled image by linking the positional data supplied by scanning mirror device 5 with the detection results supplied by correlation device 60. A position estimation device 80 connected downstream from position detection device 70 optimizes the positional data of light point P of laser pointer 4 supplied by position detection device 70. The optimized positional information of light point P of laser pointer 4 can subsequently be transmitted to computing device 1 and to application programs running thereon and be put to further use there.

Figure 7:
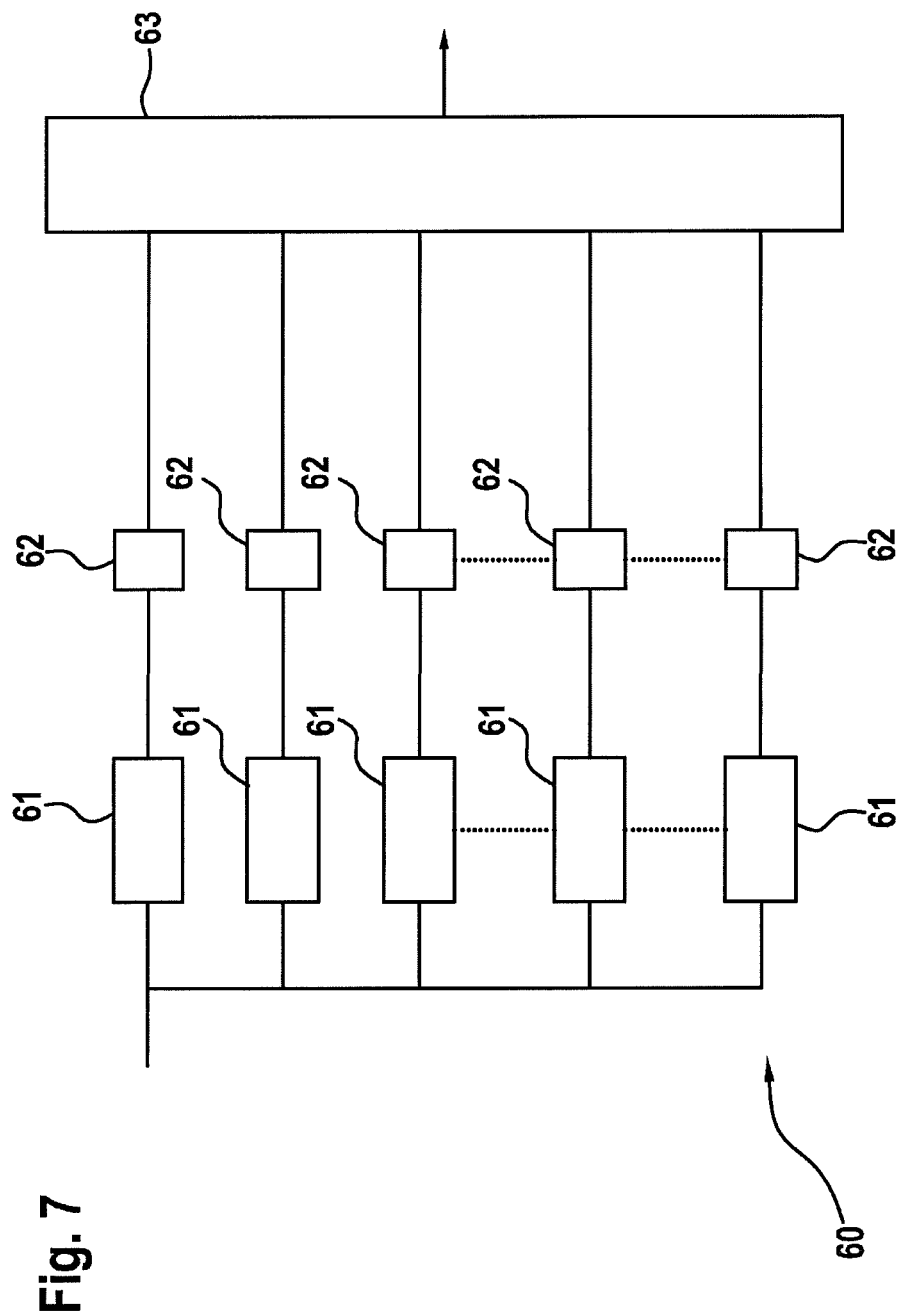
FIG. 7 shows a basic circuit diagram of a correlation device having multiple correlators.

FIG. 7 shows a structure of correlation device 60 in a detailed basic diagram. Correlation device 60 preferably is implemented in the form of a rake receiver. Such a receiver has a separate receiving finger for every possible code. As a result, correlation device 60 encompasses multiple correlators 61 that are switched in parallel, each correlator 61 being provided for one code exclusively. Threshold value deciders 62, which are connected to each correlator 61, are adjusted with regard to their threshold value in such a way that a detection of the codes is able to be performed in an unambiguous manner. Because of the excellent correlation characteristics of the CDMA codes, the threshold values are easy to adjust. In one variant, threshold value deciders 62 are implemented as so-called "soft deciders", which are used to ascertain probability values for a decision reliability. A downstream multiplexer 63 links the detection results of correlators 61 and forwards them to downstream position detection device 70.

Figure 8:
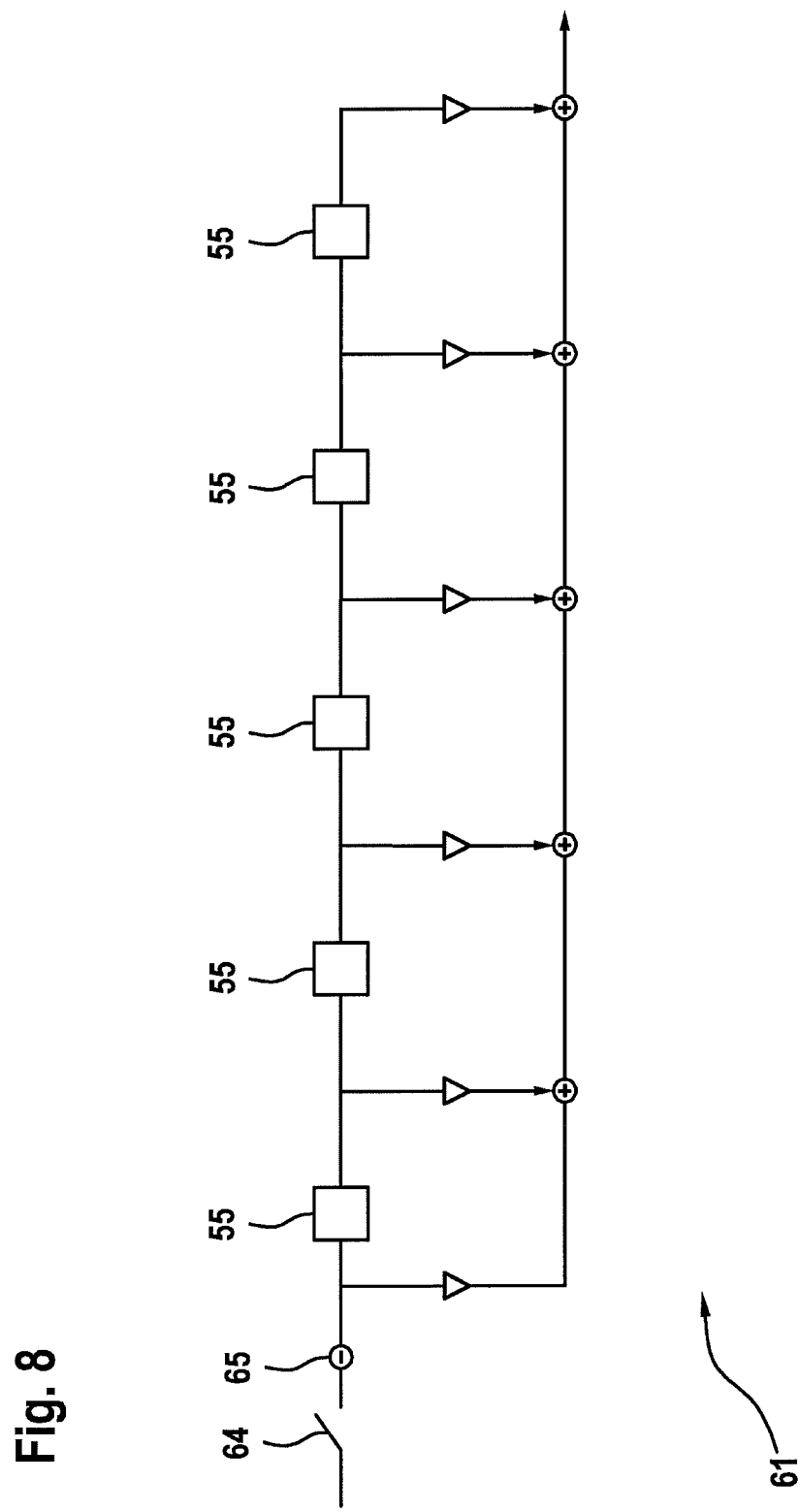
FIG. 8 shows a basic structure of an individual correlator.

FIG. 8 shows the structure of a single correlator 61 in a detailed basic representation. For example, correlator 61 may be realized as a matched filter and be implemented as a finite impulse response (FIR) filter. As an alternative, it is also possible to use VHDL (very-high-speed-integrated circuit hardware description language) models for such structures. Using a scanning element 64, the input signal supplied by A/D converter 23 is scanned and then provided with an offset by an offset element 65. The offset is used for adapting the average value of the signal for the correlation. The received signals are overscanned, which makes a code synchronization between laser pointer 4 and detection device 20 superfluous. The employed correlation sequence preferably has greater length (such as at least twice the length) than each CDMA code used.

Figure 9:
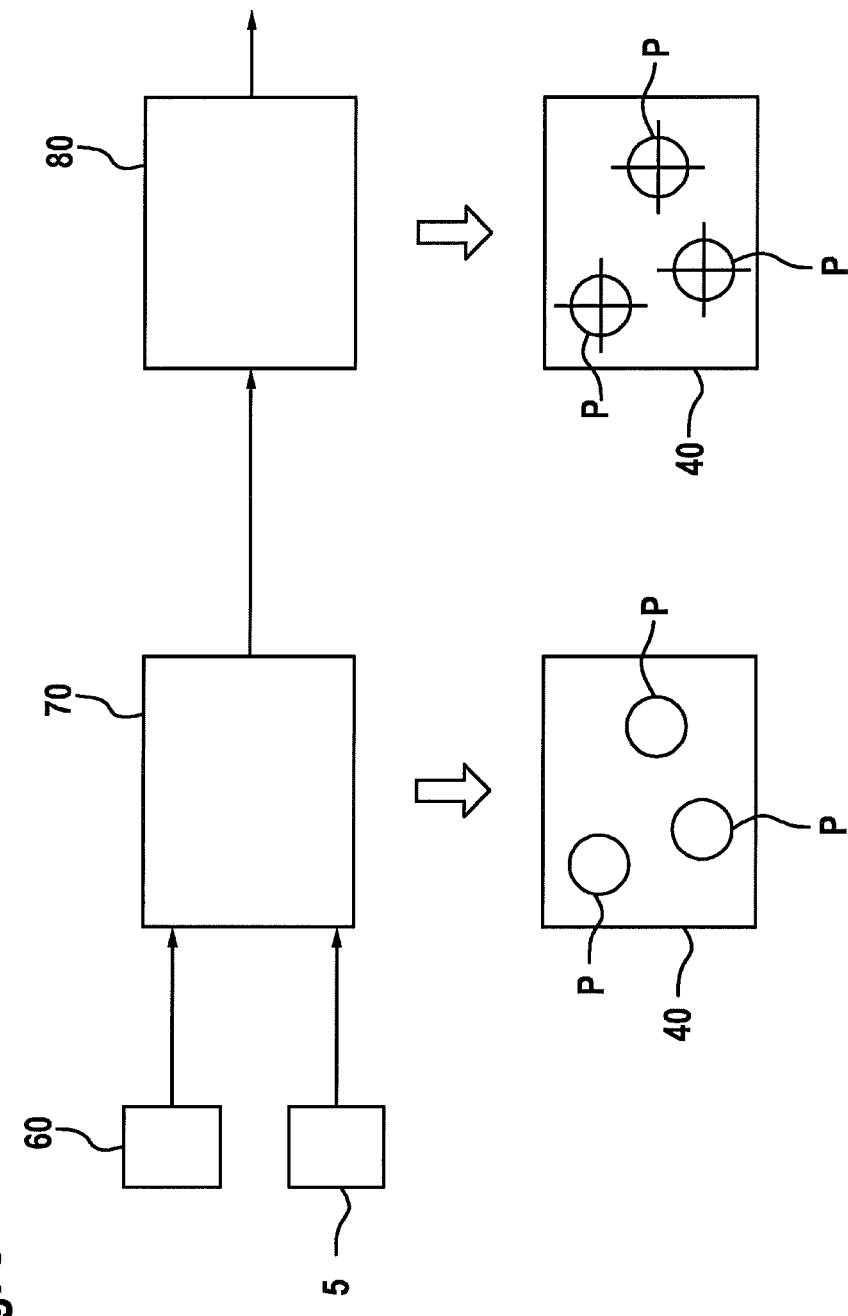
FIG. 9 shows a schematic illustration of a mode of action of the position detection device and the position estimation device.

FIG. 9 schematically illustrates a mode of action of position detection device 70 and downstream position estimation device 80. Correlation device 60 and scanning mirror device 5 forward positional data to position detection device 70. This has the result that light points P of laser pointer 4 imaged on projection surface 2 are reassembled again into an image 40 within position detection device 70. Position estimation device 80 then estimates the center points of light points P or the movement directions of laser pointers 4. Position estimation device 80 preferably is also able to compensate for shorter failures of laser pointer 4 by shading the laser beam of laser pointer 4. For example, a Kalman filter may be used for this purpose.

In an alternative specific embodiment, the method according to the present invention for position detection may also be realized in space division multiple access (SDMA) technology using a photo diode matrix, disposed outside of scanning mirror device 5, which need not necessarily be fully fitted with components.

SDMA methods, for example, are used in the LTE mobile telephony standard. The beam bundling (beam forming) realizable in this method can be used for detecting the position of the laser pointer. SDMA systems usually have multiple transmit and receive elements. In the system at hand, multiple photo diodes distributed in space would be required as receivers in order to achieve the required selectivity for the position detection. The employed photo diodes are installed in a two-dimensional arrangement at fixed positions on the outer side of laser projector 3. An integration of a photo diode 6 in laser projector 3 is not necessary.

To achieve a measurable phase difference caused by differences in the propagation time, it is necessary to use an HF carrier in laser pointer 4. The CDMA code is then modulated onto this carrier. Suitable signal processing in the receiver part then results in the exact position. In this case, as well, the identification of light point P of laser pointer 4 can take place via the CDMA codes.

In summary, the present invention provides a device and a method with which light pointer devices, preferably laser pointers, are able to be identified and localized on the projection surface of a laser projector. The method advantageously makes it possible to simultaneously identify and localize several of the light pointer devices without detectable time lag, i.e., essentially in real time. In addition, the method of the present invention allows a simultaneous differentiation among the actions (such as a push button activation) triggered by different light pointer devices.

Core of the present invention is a method for identifying and localizing one or more laser pointer device(s) on a projection surface of a laser projector. The identification of the laser pointer devices is made possible by the use of an encoding method using CDMA codes. Toward this end, a laser beam emitted by the laser light pointer device is modulated by a CDMA code. In a receiver device, the CDMA codes emitted by the laser pointer are identified in the laser projector with the aid of a correlation device. The localization of the laser pointer is achieved by the time resolution of the spatial resolution of the laser projector. The spatial resolution is achieved by the movable micromirrors of the laser projector and a suitably positioned photo diode. Subsequent signal processing optimizes the identification or localization.

The method of the present invention advantageously requires no synchronization of the laser pointers and the detection device of the laser projector. When using multiple laser pointers, the method of the present invention furthermore advantageously requires no synchronization of the laser pointers among themselves. The method advantageously requires no camera for detecting the laser pointer on the projection surface.

Possible applications of the present invention are: PC laser mouse with visible laser, laser mouse with IR laser, identification of the laser pointer having interactivity rights, interaction with virtual objects on the projection surface, interaction of multiple users with the computer, interactive games, etc.

Although the present invention has been described with the aid of preferred exemplary embodiments, it is not limited to these. The mentioned circuit examples and topologies in particular have merely exemplary character and are not restricted to the examples elucidated.

One skilled in the art will therefore be able to suitably modify or combine with one another the described features of the present invention without deviating from the essence of the present invention.

What is claimed is:

1. A device for identifying at least one laser pointer, comprising:
   a laser projector having a scanning mirror device by which a projection surface is able to be scanned periodically;
   a modulation device for a laser beam of the at least one laser pointer; and
   a detection device, situated within the laser projector, for detecting the modulated laser beam of the at least one laser pointer.

2. The device as recited in claim 1, wherein the modulation device controls a light intensity of the laser beam emitted by the laser pointer.

3. The device as recited in claim 2, wherein:
   a multiple access method is able to be implemented via the modulation device.

4. The device as recited in claim 3, wherein the multiple access method generates a CDMA code.

5. The device as recited in claim 1, wherein the laser pointer has at least one functionality, one CDMA code generator being provided per functionality.

6. The device as recited in claim 5, wherein the laser pointer includes switches for selecting the functionality, the switches including one of mechanical switches and motion sensors.

7. The device as recited in claim 1, wherein a photo diode is situated in a receiving device of the laser projector, and light projected by the projection surface being coupled into the photo diode.

8. The device as recited in claim 1, wherein the detection device includes a correlation device via which binary data are able to be correlated with CDMA codes.

9. The device as recited in claim 8, wherein the correlation device includes multiple correlators disposed in the form of a rake, each correlator being provided for one CDMA code.

10. The device as recited in claim 9, wherein each correlator is longer than each used CDMA code.

11. The device as recited in claim 8, wherein data output by the correlation device is linked with positional data of the scanning mirror device with the aid of a position detection device.

12. The device as recited in claim 11, wherein:
   the detection device includes a position estimation device for the laser pointer, and
   center points of the positional data of the position detection device are estimated by the position estimation device.

13. The device as recited in claim 1, wherein the laser pointer emits laser light having different wavelengths.

14. The device as recited in claim 1, further comprising:
   a computing device connected to the laser projector, wherein an application executed by the computing device is controllable by the laser pointer.

15. A method for identifying at least one laser pointer, comprising:
   emitting a laser beam onto a projection surface via the laser pointer, the laser beam being modulated by a modulation device;
   scanning the projection surface by a scanning mirror device of a detection device of a laser projector; and
   identifying the laser pointer via the modulated laser beam.

16. The method as recited in claim 15, wherein a wave reflected by the projection surface is coupled into a photo diode in a beam path of the laser projector.

* * * * *